INVENTOR.
HARRY ANTLER
BY
Agent

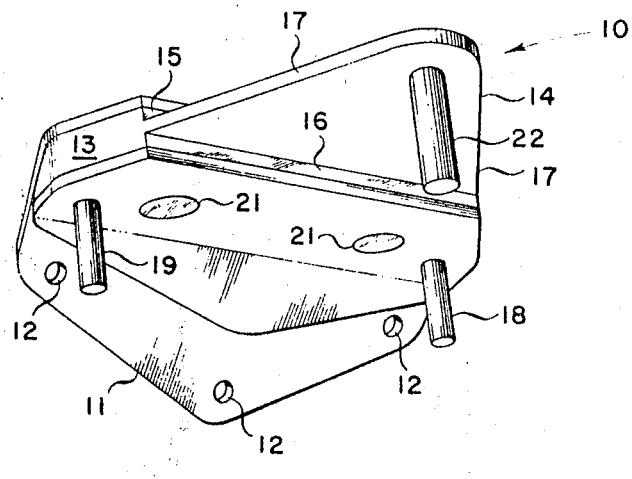

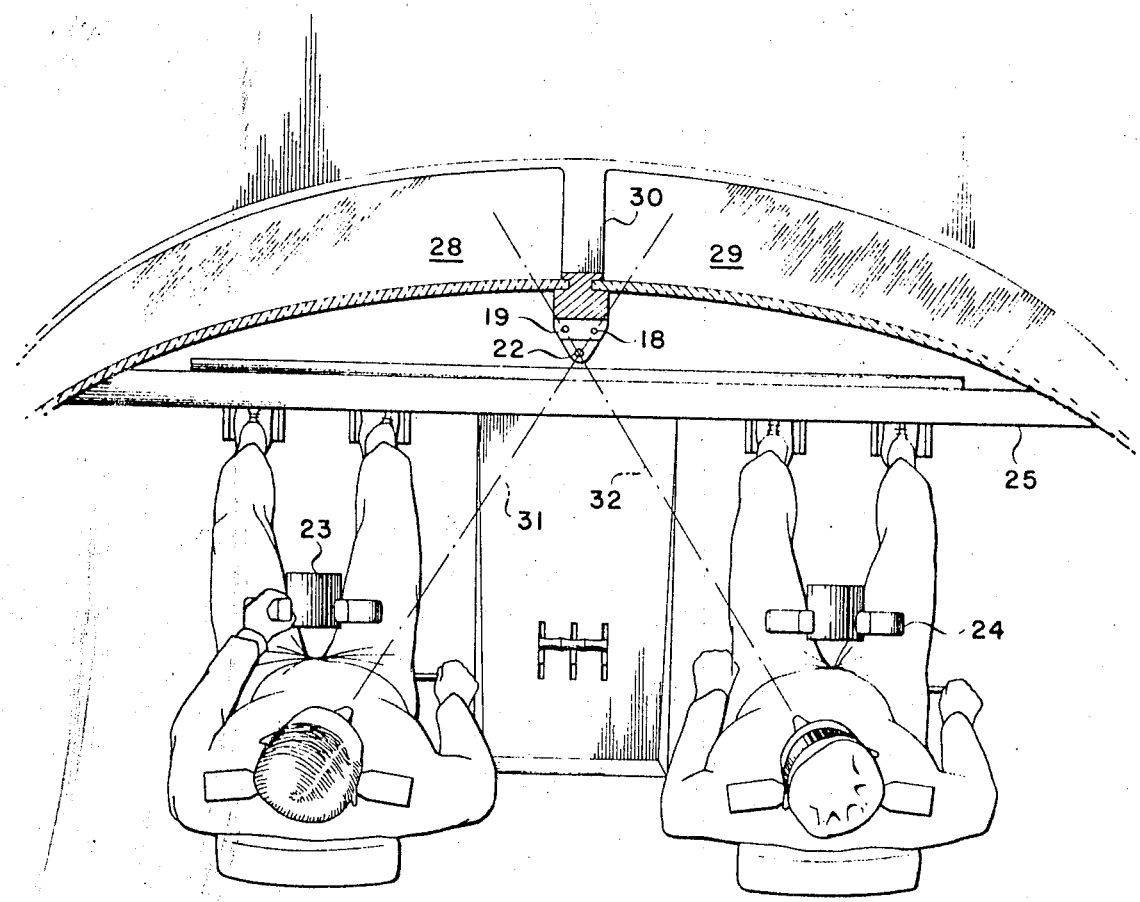

United States Patent Office 3,613,250
Patented Oct. 19, 1971

3,613,250
EYE POSITION INDICATOR FOR MOUNTING IN A VEHICLE
Harry Antler, North Hollywood, Calif., assignor to Lockheed Aircraft Corporation, Burbank, Calif.
Filed June 22, 1970, Ser. No. 48,403
Int. Cl. G01c 1/00
U.S. Cl. 33—63
10 Claims

ABSTRACT OF THE DISCLOSURE

This disclosure involves an eye position determining device and indicator for mounting within view of the operator on the centerline of a vehicle.

It employs a body of light-conducting material with an internal light source and localized light-emitting and light-blocking regions so arranged that a pre-determined image, for example, a pair of horizontal parallel lines and a halo of light around a vertical rod are observed by the operator only when his head and eyes are in the correct position for precise maneuvering of the vehicle. It employs a planar light-blocking member restricting vision of the operator in view of the indicator so that he can view the parallel lines only when his eyes are at the required vertical distance above a pre-determined reference in the vehicle. The indicator includes a source of light and a light interrupter, so arranged that the light source is visible at all times unless the observer's eyes are at the correct angular displacement relative to the indicator.

BACKGROUND OF THE INVENTION

As refinements in the development of larger and faster aircraft occur, the need to instantaneously communicate critical information to the pilot has become of major importance. Likewise, extraneous information is a distraction and must be eliminated. This is particularly true during landing.

It has been found that the pilot on landing, particularly in fog conditions, has a minimum period measured in seconds to make decisions to land or go around, depending upon the information he receives through his eyes from both the instruments in the cockpit and conditions on the ground.

It is possible for the pilot to obtain all the visual information only when he is in the correct position relative to the instrument panel and the windshield at the critical instant for decision making.

Heretofore, the primary control of pilot head position has been the pilot's own adjustment of the seat to the position comfortable to him and one which he feels gives him the best view. Systems have been developed, including active sensors to sense the pilot's eye position and through servo mechanisms present an additional visual signal to him indicating the correction which he should make.

Head restraining systems also have been proposed but the interference with the pilot's normal or desired movement encountered is impractical and unpleasant to the pilot.

In view of the foregoing, it is the general object of this invention to provide an improved pilot eye locator.

Another object of the invention is to provide an eye locator which is simple and accurate in eye positioning.

Another object of the invention is to provide an eye locator with contrasting indicating surfaces for visibility in daylight, and capability of emitting light through the indicating surfaces for visibility in darkness.

An additional object of this invention is to provide an eye position locator which provides minimum interference with normal vision of the pilot and which provides eye position information to both pilot and co-pilot simultaneously.

A further object of this invention is to provide an eye positioning locator which employs no physical restraint or sensors upon the pilot.

BRIEF DESCRIPTION OF THE INVENTION

The foregoing objects of this invention are all achieved by the eye positioner comprising a body of light-conducting material positioned on the centerline of the aircraft. The eye positioner includes an internal light source and a plurality of light-emitting regions. Two light-emitting regions are slit-like and positioned parallel in the horizontal plane. They are separated by a light barrier such that both regions are not visible unless the pilot's eyes are at the required elevation.

A light-emitting rod and a light-blocking rod are so positioned to provide a particular light pattern when the pilot's eyes are at the proper horizontal angular deviation from the aircraft centerline. This serves to establish the required location fore and aft for the pilot. A second light-emitting rod in combination with the slits and the light-blocking rod provide eye position information for the copilot.

BRIEF DESCRIPTION OF THE DRAWINGS

The foregoing features of this invention may be more clearly understood from the following detailed description and by reference to the drawings in which:

FIG. 1 is a perspective view of the position indicator, viewed from below;

FIG. 2 is a view of an aircraft flight station with the position indicator as viewed by the pilot;

FIG. 7 is a simplified top view of an aircraft flight station showing the dual use of the indicator by pilot and copilot.

Figure 3:
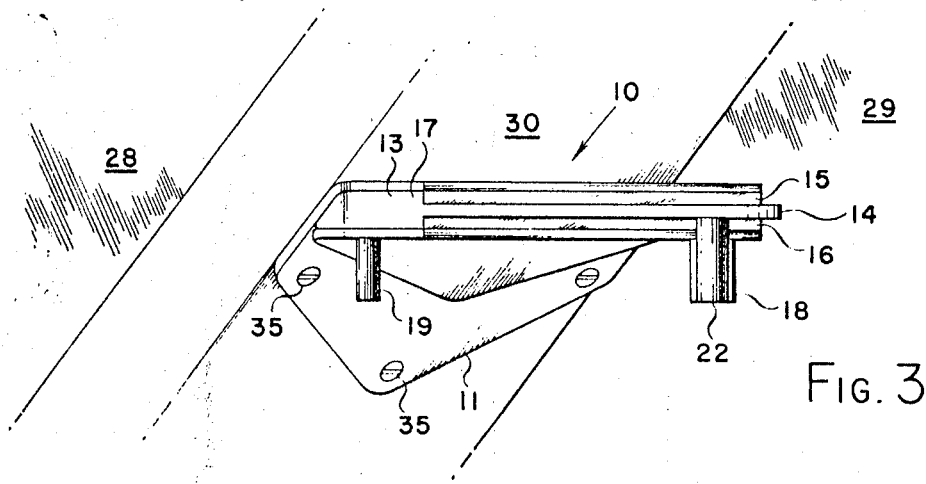
FIG. 3 is an enlarged view of the indicator of FIG. 2 again as seen by the pilot.

Now refer to FIG. 1 in which the underside of the position indicator 10 may be seen. A bracket 11, having holes 12 therethrough for mounting to an aircraft windshield center post, supports a light-transmitting body 13 of generally flat rectangular shape and having a substantially triangular blade 14 of lesser thickness extending therefrom to provide two narrow parallel strips 15 and 16 separated by blade 14. The edge surfaces 17 of body 13 and blade 14 are opaque to light. Two light-transmitting rods 18 and 19 extend downwardly from the body 13 and a light source 21 is disposed within and flush with the bottom of the assembly. The light source 21 is energized by a source of electricity which is connected to an electrical connector (not shown) disposed in the indicator 10. An opaque rod 22 extends downwardly from a point adjacent the outer apex of triangular blade 14.

Referring now to FIG. 2 in which a pilot's eye view of the flight station of a commercial type aircraft may be seen, including a pair of side-by-side control wheels 23 and 24 for the pilot and copilot, respectively, an instrument panel 25, a low-reflectance glare shield 27 positioned substantially between the instrument panel 25 and a windshield. The windshield is separated by a center post 30 into two parts 28 and 29 and the position indicator 10 is attached to the windshield center post 30.

The position indicator 10 is shown as it would appear to a pilot viewing it from the correct eye position.

Now refer to FIG. 3 which shows the position indicator 10 in the same eye position as shown in FIG. 2, but enlarged and in greater detail. Bracket 11 is shown attached to the windshield center post 30 with fasteners 35 in alignment with the aircraft centerline. When the pilot's eyes are in the correct specified spatial position during darkness, light transmitted from the light source 21 through the body 13 will be visible to the pilot in the form of (a) equal-width parallel strips 15 and 16 separated by the dark opaque edge 17 of blade 14, and (b) in the form of the luminous sides of light-transmitting rod 18 being visible on each side of the opaque rod 22.

Figure 4:
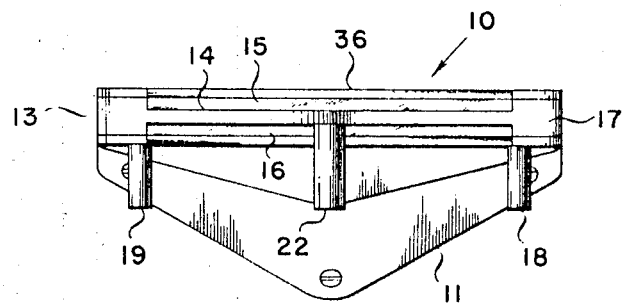
FIG. 4 is a front elevational view of the indicator of FIG. 3.

Now refer to FIG. 4 which is a front elevation view of the position indicator as it would appear as viewed looking forward along the aircraft centerline and in which light-transmitting rods 18 and 19 are symmetrically disposed about the opaque rod 22, so that the opaque rod 22 will be positioned in front of the light-transmitting rod 18 from the pilot's line of sight, and in front of light-transmitting rod 19 from the copilot's line of sight. Viewed from any angle other than the correct angles of view, both rods 18 and 19 will be visible to the pilot and copilot thereby signalling an eye position error in the fore and aft location.

Figure 5:
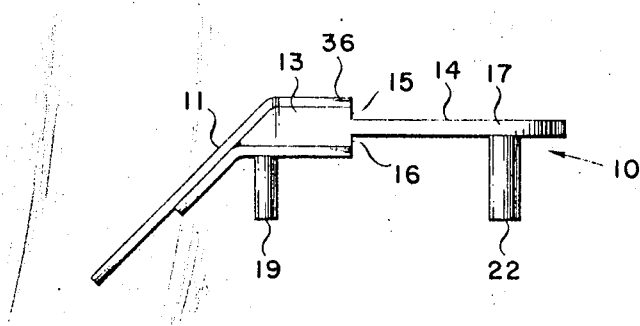
FIG. 5 is a side view of the device of this invention.
Figure 6A:
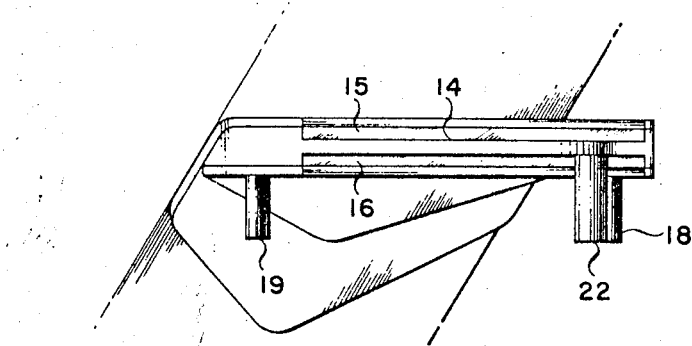
FIGS. 6a, 6b, 6c and 6d are simplified representations of the device in various degrees of the eye position errors.
Figure 6B:
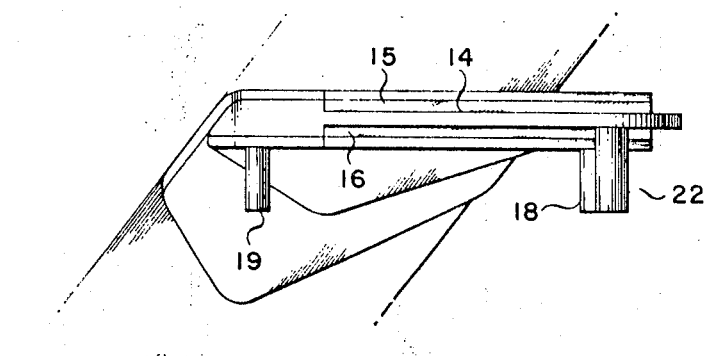
Figure 6C:
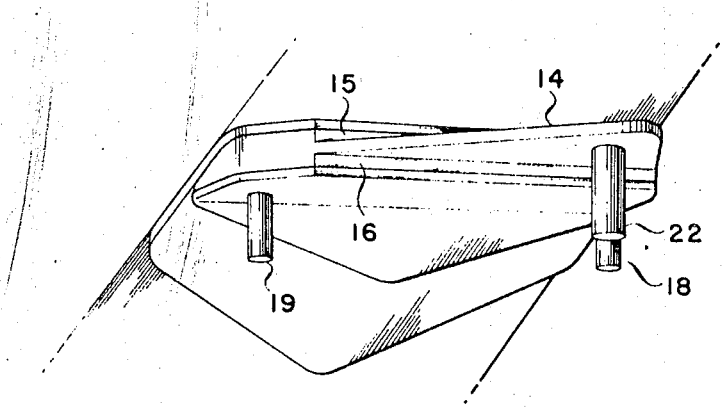
Figure 6D:
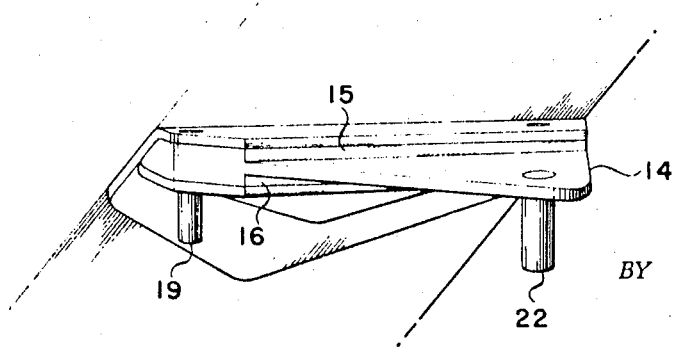

Now refer to FIG. 5 which is a side elevation view of the position indicator as seen normal to the aircraft centerline, and in which a portion of the bracket 11 is at an angle corresponding to the slope of the aircraft windshield center post 30 and has a horizontal portion 36 adapted to support body 13 in the horizontal plane. The triangular blade 14 is shown extending from body 13 so that opaque edge 17 visually separates the light-emitting parallel strips 15 and 16.

During darkness when the ambient light available is insufficient to observe either the strips 15 and 16 or the rods 18 and 19, the light source 21 is energized thereby illuminating the body 13, blade 14 and rods 18 and 19. Since the sides of the body 13 and blade 14 are opaque, light is not visible therethrough; however, the rods 18 and 19 and strips 15 and 16 are transparent and therefore appear illuminated. In order to correctly position his eyes during darkness the pilot needs only to adjust his vertical position until the opaque edge 17 of the blade 14 bisects the illuminated strips 15 and 16 and adjust his angular position relative to the longitudinal axis of the airplane until the opaque rod 22 bisects the glow of the illuminated rod 18.

Visible contrast for use during ambient daylight operation (without internal illumination) is provided by coating the light-emitting surfaces, rods 18 and 19, and strips 15 and 16 with a white paint. This layer of white paint is capable of transmitting the internal light used for night time operation.

Referring now to FIGS. 6a, 6b, 6c and 6d in which 6a is a pilot's view of the position indicator 10 when the pilot's eyes are in the correct horizontal plane as indicated by equal visibility of strips 15 and 16, and are aft of the correct azimuth position in the horizontal plane as indicated by visibility of an excessive amount of light-transmitting rod 18 to the right of opaque rod 22. In 6b the pilot's eyes are in the correct horizontal plane as indicated by the equal visibility of strips 15 and 16, and are forward of the correct azimuth position in the horizontal plane as indicated by visibility of an excessve amount of rod 18 to the left of rod 22. In 6c the pilot's eyes are below the correct horizontal plane as indicated by partial obscuration of strip 15 by blade 14, and are in the correct azimuth position as indicated by the alignment of rod 22 in front of rod 18.

In 6d the pilot's eyes are above the correct horizontal plane as indicated by the partial obscuration of strip 16 by blade 14. The copilot's view of the error indications would be a mirror image of the described pilot's views, but with the relationship of opaque rod 22 with respect to light-transmitting rod 19 as the azimuth indication.

Now refer to FIG. 7 which is a top elevation view of the flight station of a typical commercial aircraft showing a simplified representation of the position indicator 10 attached to the aircraft windshield center post 30, and showing the pilot and copilot in the respective correct azimuth eye position as indicated by their visual alignment along sight lines 31 and 32 wth rods 22 and 18, and 22 and 19, respectively.

The above-described embodiments of this invention are merely descriptive of its principles and are not to be considered limiting. The scope of this invention instead shall be determined from the scope of the following claims, including their equivalents.

I claim:

1. An eye position indicator for use in locating an operator's eyes in a predetermined direction comprising:
    a source of light in a body of light-conducting material, including a pair of vertically displaced light-emitting regions; and,
    a light barrier positioned between the light-emitting regions whereby both regions are equally visible only when the viewer's eyes are substantially in the horizontal plane of the light divider,
    said body including a third light-emitting region and a second light barrier,
    said second light barrier located between the third light-emitting region and the operator's eyes,
    said barrier positioned to at least partially obstruct the operator's view of the third light-emitting region when the operator's eyes view the indicator from a predetermined azimuth angle.

2. An eye position indicator as described in claim 1 in which a fourth light-emitting region is provided which is laterally displaced from said third light-emitting region so that said second light barrier is also positioned to at least partially obstruct a second operator's view of the indicator from a different azimuth angle in the same horizontal plane.

3. An eye position indicator as described in claim 1 in which the light-emitting regions are portions of a body of light-transmitting material having a light source dispersed therein.

4. An eye position indicator as described in claim 1 in which the light-emitting regions are portions of a body of light-transmitting material and are colored to provide suitable contrast for daylight use.

5. An eye position indicator as described in claim 1 in which said pair of vertically-displaced light-emitting regions are in the form of closely spaced, parallel, horizontal strips, and said light barrier is a horizontally positioned flat blade separating said strips.

6. An eye position indicator as described in claim 1 in which said pair of vertically-displaced light-emitting regions are closely-spaced, horizontal flat portions of a generally rectangular light-transmitting body, said body having a blade-like barrier extending outwards between said light-emitting regions, said blade-like barrier having light-opaque edges and transparent, flat surfaces suited to the reception of ambient light, whereby a portion of the ambient light received is transmitted by said body through the light-emitting regions.

7. An eye position indicator as described in claim 1 in which said pair of vertically-displaced light-emitting regions are closely-spaced, horizontal flat portions of a light-transmitting body said body having a blade-like barrier extending outwards between said light-emitting regions and having light-opaque edges, said third light-emitting region being an elongated vertical projection of said light-transmitting body, said second light barrier being an elongated vertical light-opaque member extending vertically from the blade-like barrier, whereby illumination from said light source is transmitted through said body to all of the light-emitting regions.

8. An eye position indicator for use in a vehicle to aid in the location of two side-by-side operators' eyes for optimum visibility comprising:
- a pair of light-emitting areas laterally spaced apart in a common horizontal plane; and,
- a light barrier positioned at the point where the line of sight of the right-hand operator's view of the left-hand light-emitting area intersects the line of sight of the left-hand operator's view of the right-hand light-emitting area, whereby the light barrier at least partially blocks each operator's view of one of the light-emitting areas from a specified azimuth angle.

9. An eye position indicator as in claim 8, including:
- a second pair of light-emitting regions vertically spaced apart; and,
- a second light barrier positioned between the light-emitting regions, whereby both of the second pair of light-emitting regions are equally visible to both operators only in a specified horizontal plane.

10. An eye position indicator for use in a vehicle to aid in the location of two side-by-side operators' eyes for optimum visibility, including:
- an angle bracket having a horizontal planar portion and a portion corresponding to the angle of and attached to a vehicle windshield;
- a light-transmitting body of generally rectangular shape attached to said bracket, and having an opaque-edged, generally triangular blade of lesser thickness extending therefrom to provide a narrow parallel strip above and below the triangular blade;
- two generally cylindrical, laterally-spaced, light-transmitting rods extending downwards from said rectangular body; and
- an opaque rod extending downwards near the outer apex of said triangular blade, whereby light emitted from a light source is transmitted through said light-transmitting body to each of said downward-extending light-transmitting rods and is at least partially blocked from the view of each operator from a specified azimuth position.

References Cited

UNITED STATES PATENTS 3,495,908　2/1970　Rea _____ 356—172

RONALD L. WIBERT, Primary Examiner

O. B. CHEW II, Assistant Examiner

U.S. Cl. X.R.

33—64 R